Aug. 20, 1957 L. E. GARCIA 2,803,186
BALER
Filed May 28, 1953
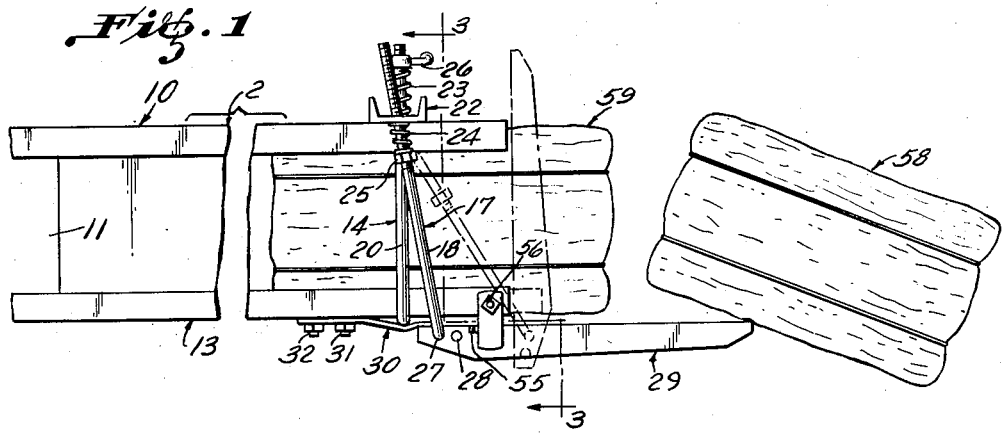
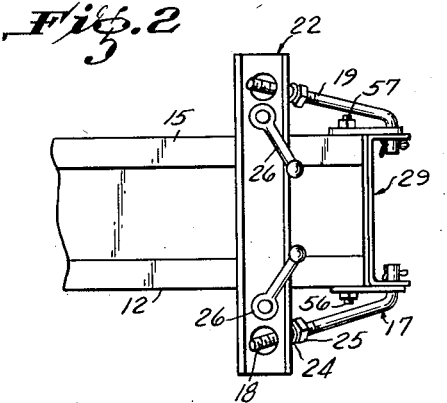
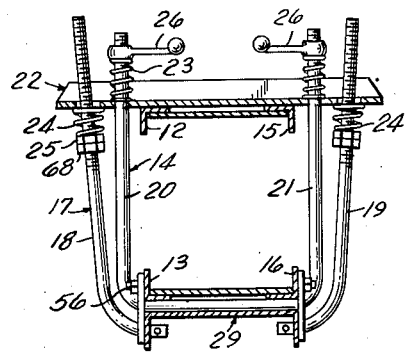
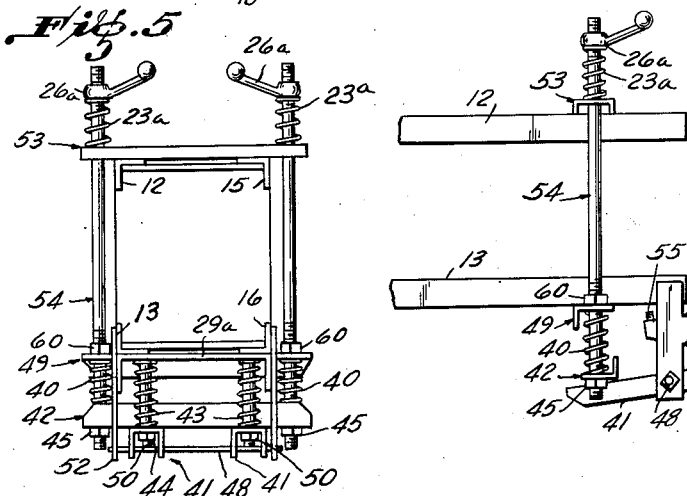
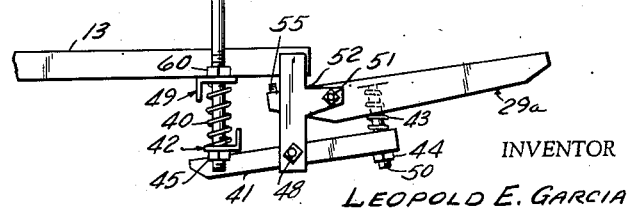
INVENTOR
LEOPOLD E. GARCIA
BY Charles L. Sturtevant
ATTORNEY

United States Patent Office 2,803,186
Patented Aug. 20, 1957

2,803,186

BALER

Leopold E. Garcia, Bernalillo, N. Mex.

Application May 28, 1953, Serial No. 358,081

17 Claims. (Cl. 100—43)

The present invention relates to new and useful improvements in balers and, more particularly, to improvements in a baling sleeve or chamber for hay baling machines and the like.

Heretofore, in most instances, finished bales of hay have varied throughout a relatively wide range in weight and density even in the same fields. Cut or mowed hay is extremely sensitive to weather and soil conditions. For example, variation in ground level and irrigation of such ground will vary the moisture content of the soil, and the hay will react either before or after windrowing to the length of time it is left on the ground and, of course, it will be subjected to varying conditions of sun intensity, rain, wind and the like. For example, hay lying in the hot sun for an hour longer than previously baled hay can result in as much as 10 pounds difference per bale from the same field. These resultant variations in bale weight are minimized as much as possible by constantly making manual and guess work adjustment on the compression unit, but this often involves stopping of the machine for this purpose. It is the object of the present invention to provide a continuously operable means for controlling within limits the bale weight in accordance with a predetermined setting.

An object of the present invention is to provide, in a baling machine, means for automatically regulating and averaging the bale weight within certain limits.

Another object of the invention is to provide a baling chamber or sleeve with means constantly responsive to the weight of each issuing bale for automatically maintaining the next issuing bale within a predetermined weight limit.

A further object of the invention is to provide a device of the above type wherein a discharge platform is subjected to the weight of the issuing bale and is connected to the baling sleeve in a manner to automatically adjust the tension offered by the sleeve to the next succeeding bale passing therethrough.

A still further object of the invention is to provide a device of the above type wherein compensating spring means between the discharge platform and the bale sleeve are provided for automatically maintaining a substantially constant weight of issuing bale.

The invention also aims to provide a device of the above type which is inexpensive to manufacture, simple and effective in its operation, and one which may be readily attached to existing baling machines.

The above and other objects of the invention will in part be obvious and will be hereinafter more fully pointed out.

In the accompanying drawings:

Figure 1 is a fragmentary side elevation of the bale sleeve forming one embodiment of the present invention;

Figure 2 is a fragmentary top plan view of Figure 1 but with the discharge platform or gate in closed position;

Figure 3 is an end sectional view taken substantially along line 3—3 of Figure 1;

Figure 4 is a fragmentary view of the baling sleeve with a modified form of weight control; and Figure 5 is a rear end view of Figure 4.

Referring more in detail to the accompanying drawing and particularly Figures 1, 2 and 3, at this time, the baling sleeve or chamber is indicated generally by the numeral 10. This chamber includes side plates 11 between which a compressing plunger (not shown) operates; a pair of top flanged members 12 and 15 and a pair of bottom flanged members 13 and 16 between which the issuing bales are passed. The delivery ends of the members or rails 12, 13, 15 and 16 may be closed by a gate or discharge platform 29 in the dotted line position of Figure 1, but during operation of the machine, the discharge platform 29 assumes the full line position of Figure 1 so that each bale issuing from the machine subjects the end of the gate or platform 29 to the full weight of the issuing bale.

The gate or platform 29 is pivoted at 56 to each side of the lower flanged members 13 and 16. This pivotal connection is intermediate the ends of platform 29 but near the rear end thereof. The rear end of the platform 29 includes spaced apertures 27 and 28 on each of the depending side flanges thereof and in a corresponding pair of such apertures the inturned ends of rods 18 and 19 are pivotally connected. The upper ends of the rods 18 and 19 pass freely through apertures in a U-shaped or other suitable form of bracket 22 which is secured, as by welding or the like, across flanged members 12 and 15. Coil springs 24 are disposed around each of the rods 18 and 19 and between the lower face of the bracket 22 and nut members 25 threadedly engaging the rods. The nut members serve as lower abutments for the coiled springs 24 and also as means for adjusting the tension thereof.

A rod-like strap is passed beneath the lower flanged members 13 and 16 and the arms 20 and 21 thereof also extend upwardly through the bracket 22. Above the upper face of the bracket 22, coil springs 23 encircle the arms 20 and 21 with the lower ends abutting upper surface of the bracket 22 and with the upper ends abutting handled screws 26 or the like. Thus, the strap embraces the flanged rails forming the baling chamber. There are a pair of leaf springs 30 each secured, as at 31 and 32, to one of the lower flanged members 13 and 16 and the free ends of the leaf springs are in position to be engaged by the rear end of the platform 29 when in open position. There is, of course, sufficient clearance between these springs and the closed end of the strap to permit the desired flexing operation of the springs. These leaf springs 30 are of such tension that they will act on the platform to balance a predetermined minimum weight of finished bale, such as the bale 58, issuing from the machine and about to drop from the platform.

Assuming a desired bale weight of approximately 80 pounds and without any regulation thereof, the bales may vary from 60 to 100 pounds depending on the variable conditions mentioned above. With the present device, the various springs will be adjusted so that with an average 80-pound bale weight on the responsive support or gate 29 the springs 30 will be supporting about 60 pounds and the reactor springs 24 will be supporting or resisting a weight of approximately 20 pounds. Thus, the reactor springs 24 will be compressed by about 20 pounds of the bale weight which will allow it a working range of about 40 pounds. Thus, being compressed to approximately mid-capacity, the springs can operate, as will be hereinafter pointed out, to make the bales heavier or lighter by approximately 20 pounds. The reactor springs 24 may be as strong as the squeezing springs 23 but preferably a little softer.

During operation of the device shown in Figures 1, 2 and 3, let it be assumed that the issuing bale is too heavy, that is, above the predetermined minimum weight of 80 pounds, the weight responsive platform 29 will be depressed about its pivots 56 in a clockwise direction, thus overcoming the balancing force of the leaf springs 30.

This clockwise movement of the platform 29 will result in an upward movement of the reactor unit 17, which includes the rods 18 and 19, thus tending to compress the reactor springs 24 between the bolts 25 and the under surface of the cross-beam 22. There is thus afforded a reaction against the squeezing springs 23 which shifts the bracket or beam 22 upwardly in order to allow a slight relative spread between the top compressing members 12, 15 and the bottom compressing members 13, 16. This results in less resistance within the baling chamber end so that a lighter bale will follow the previously excessively heavy bale.

On the other hand, when the issuing bale is too light, the platform 29 will not settle to its predetermined balanced position against the springs 30. Under this condition, the reactor unit, that is, the two rods 18 and 19 will shift slightly downwardly and the reactor springs 24 will reduce pressure on the bracket 22 and thus allow the squeezing springs 23 to increase pressure by the same amount on the compressing members. There will thus result an increased resistance in the baling chamber which will in turn result in a heavier issuing bale.

The springs 30 may be adjusted in any suitable manner, as by washers or wedges under the bolts 31 and 32, so as to balance all of the weight of a pre-selected bale weight minus one-half the amount in pounds for which the device may be set to compensate, this latter amount being adjusted into the reactor springs 24 as indicated above. The upper ends of the reactor rods 18 and 19 may, if desired, be fitted with sleeves or made of a different diameter than the threaded portion in order to avoid wear on the threaded portion because these rods are constantly working up and down in the beam or cross-arm 22. The spaced apertures 27 and 28 are for the purpose of adjusting the leverage for the reactor rods 18 and 19.

In Figures 4 and 5, there is illustrated a modified form of the invention operating on the same general principles, but particularly relating to a different arrangement of balancing springs. In this form of the invention, a single pair of rods 54 extend downwardly through a transverse bracket 49 secured across the lower flanged compression members 13 and 16. Coil springs 40 encircle the depending ends of the rods and are confined between the transverse bracket 49 and a lower bracket 42 which lower bracket is in contact with a pair of arms 41 spaced transversely of the delivery end of the baling chamber. These lever arms 41 are pivoted intermediate their ends to depending strap members 52 which are suitably secured to and depend from the lower flanged members 13 and 16. The upper ends of the rods 54 extend through a transverse bracket 53 secured to the upper compression members 12 and 15 and coil springs 23a encircle the upwardly projecting ends of the rods. The tension of the springs 23a may be adjusted by handled members 26a threadedly engaging the rods.

The platform or bale weight responsive member 29a is pivoted, as at 51, between the depending straps 52, and intermediate portions thereof react on adjacent ends of the lever arms 41 through the medium of bolts 50 upon which the platform bears when in operative position. These bolts are encircled by coil springs 43.

In this form of the invention, the coil springs 40 combine the balance and reaction forces of springs 30 and 24 referred to in the first form of the invention and are preferably stiffer than the squeezing springs 23 by an amount approximating the weight of the lightest bale intended to issue. Nuts 60 threadedly engaging rods 54 above the transverse bracket 49 determine the maximum and minimum range of setting of the device and adjustment of the nuts 45 at the extreme ends of the rods 54 will effect adjustment of the reaction springs 40.

In this form of the invention, the springs 40 and 43 are adjusted to balance the platform 29a in a predetermined position upon passage thereover of a bale having a selected minimum weight. When a heavier bale passes over the platform 29a, it will be depressed in a clockwise direction against the action of the springs 43 and this, in turn, will cause the opposite end of the lever arms 41 to bear upwardly against the transverse bracket 42. In slightly elevating the cross-beam or bracket 42, the coil springs 40 will then assume the bale load and perform the combined functions of the leaf springs 30 and the reactor springs 24 according to the first form of the invention above described. In being thus slightly compressed, the coil springs 23a will be relieved in tension so that the flanged compression members 12 and 15 can be slightly elevated and offer less resistance to the passage of a succeeding bale through the baling chamber. In this manner, and as previously explained, the device tends to average out the individual bale weights depending on the predetermined setting of the adjustment of the springs and the like.

From the foregoing description, it will be understood that the present invention provides a device which immediately senses the weight of a bale issuing from the bale chamber ready for discharge. The device does not operate at a particular moment but rather the platform 29 or 29a constantly reacts to the weight of the issuing bale so as to effect, if necessary, a relative adjustment between the flanged members which form part of the shiftable wall portions of the baling chamber. In other words, the weight of an issuing bale will effect a movement of the platform, depending upon whether the bale is overweight or underweight, in one direction or another so as to vary the resistance offered by the wall portions of the baling chamber to the next bale passing therethrough. The device is thus continuously operating and the entire bottom surface of the issuing bale is in contact with and presses upon the platform so that its weight will effect movement of the platform in one direction or another to reflect a corresponding adjustment of the wall portions of the baling chamber. The platform 29 or 29a also conveniently serves as a closure for the baling chamber when the device is not in operation.

This device may be readily attached to existing machines, and while not in the nature of scales, the device does operate as a regulator or governor so as to maintain the issuing bales within a relatively narrow weight range which will depend upon the original setting of the adjustable springs.

While certain forms of the invention have been shown for purposes of illustration, it is to be clearly understood that various changes in the details of construction and arrangement of parts may be made without departing from the scope and spirit of the invention as set forth in the appended claims.

I claim:

1. In a hay baler, means providing a baling chamber including upper and lower relatively shiftable members offering frictional resistance to the bale being compressed while passing through the baling chamber, means operable independently of the bailing chamber and disposed substantially horizontally at the delivery end thereof to be responsive to the weight of a bale issuing therefrom, and means operatively interconnecting said bale weight responsive means with said shiftable members and including spring means exerting a variable compression force on said shiftable members according to the positioning of the bale weight responsive means for varying the effective resistance offered to a bale passing there-along whereby to substantially maintain an average weight of issuing bales within relatively close predetermined limits.

2. In a hay baler as claimed in claim 1, wherein the bale weight responsive means is in the form of a platform shiftably mounted adjacent the delivery end of said baling chamber and shiftable in accordance with the weight of an issued bale thereon to effect operation of the means interconnecting the platform with the shiftable members.

3. In a hay baler as claimed in claim 2, wherein the platform is pivotally mounted adjacent the delivery end of the baling chamber and wherein spring means are provided for balancing at least a portion of a predetermined bale weight on the platform.

4. In a hay baler as claimed in claim 3, wherein the connecting means between the platform and the shiftable members includes additional spring means for balancing another portion of the predetermined bale weight on the platform.

5. In a hay baler as claimed in claim 1, wherein the bale weight responsive means is in the form of a platform in operative position and a gate operable in inoperative position to close the delivery end of the baling chamber when not in use.

6. In a hay baler, means providing a baling chamber including relatively shiftable wall portions offering frictional resistance to the bale being compressed while passing therebetween, a supporting member disposed substantially horizontally and connected to one of said shiftable wall portions at the delivery end thereof, means including a balancing spring for mounting said supporting member for relative shifting movement under the influence of the weight of a bale resting thereon, said balancing spring being adjusted to balance the supporting member for a predetermined bale weight and means connecting said supporting member to the other of said wall portions for shifting the said last named wall portion in either direction depending up the weight of a bale on the supporting member whereby to substantially maintain an average weight of issuing bales within relatively close predetermined limits.

7. In a hay baler as claimed in claim 6, wherein the supporting member is pivotally mounted intermediate the ends thereof and wherein the balancing spring is in the form of a leaf spring engaging the inner end of the platform.

8. In a hay baler as claimed in claim 6, wherein spring means are provided for normally pressing said wall portions toward one another and wherein the connecting means between the supporting member and one of the wall portions includes spring means reacting against the spring means normally compressing the wall portions together with a force determined by the weight of a bale on said platform.

9. In a hay baler, means providing a baling chamber including upper and lower shiftable wall portions offering frictional resistance to the bale being compressed while passing therebetween, means interconnecting said wall portions and including spring means for normally pressing the wall portions together, a platform pivotally mounted adjacent the delivery end of the baling chamber and projecting rearwardly from the lower wall portion to receive a bale issuing from the baling chamber, spring means operatively connected to said platform for balancing a predetermined bale weight thereon, and means connecting said platform with one of said wall portions and operating to shift the same in accordance with the weight of a bale on said platform to vary the compressive force of the spring means tending to compress the wall portions whereby to substantially maintain an average weight of issuing bales within relatively close predetermined limits.

10. In a hay baler as claimed in claim 9, wherein a balancing spring is carried by the lower wall portion for engaging the platform in operative position and wherein rod-like members project upwardly from the inner end of said platform into association with the upper wall portion and carry coil springs tending to urge the upper wall portion in an upward direction upon clockwise rotation of the platform about its pivot.

11. In a hay baler as claimed in claim 10, wherein the rod-like members are free to be retracted relative to the upper wall portion as the platform is shifted to a bale chamber closing position.

12. In a hay baler, means providing a baling chamber including upper and lower relatively shiftable wall portions offering frictional resistance to the bale being compressed while passing therebetween, a bracket extending across the upper wall portion and projecting outwardly therefrom, rod-like members extending through apertures in the projecting ends of said bracket and connected to the lower wall portion, coil springs encircling the projecting ends of said rod-like members and bearing against said bracket, adjustable nut means threadedly engaging the free ends of said rod-like members and against which the opposite ends of the coil springs abut whereby the coil springs operate to compress the wall portions together, a supporting member pivoted adjacent the rear end of the lower wall portion and projecting rearwardly of the baling chamber to receive a bale issuing therefrom, means interconnecting said supporting member with the upper wall portion and including spring means operating to balance at least a portion of a predetermined weight on said platform whereby pivotal movement of the platform in either direction from its balanced position operates to vary the tension of the coil springs and thereby the resistance offered by said wall portions to the passage of a bale therebetween for substantially maintaining an average weight of issuing bales within relatively close predetermined limits.

13. In a hay baler as claimed in claim 12, wherein additional rod-like members connect the rear end of the supporting member with said bracket and carry coil springs operating against the under side of said bracket in opposition to the first-mentioned coil springs for effecting the variable resistance offered by said wall portions in accordance with pivotal movement of said supporting member.

14. In a hay baler as claimed in claim 12, wherein the balancing spring means includes a leaf spring secured to said lower wall portion and bearing against the adjacent end of said supporting member.

15. In a hay baler as claimed in claim 12, wherein the interconnecting means between the supporting member and upper wall portion includes lever means pivoted intermediate the ends thereof and having one end connected to said supporting member and the other end in operative association with the balancing spring means.

16. In a hay baler as claimed in claim 15, wherein the lever means consists of a pair of levers bearing against a transverse lower bracket normally urged downwardly by additional coil springs encircling the lower ends of said rod-like members.

17. In a hay baler, means providing a baling chamber including upper and lower relatively shiftable pressure members offering frictional resistance to the bale being compressed while passing through the baling chamber, support means pivotally mounted to one of said shiftable members and positioned adjacent the lower shiftable member to receive and pivotally respond to the weight of a bale issuing from the baling chamber, reactor members having connections with said support means at points spaced from its pivotal mounting to effect movement of said reactor members with said support means and said reactor members having connections with the upper shiftable member, and means including spring means associated with said reactor members and cooperating with one of said shiftable members for balancing at least a portion of the weight of a bale on said support means and responsive to variations of bale weight on the support means for varying the compressive force exerted by said shiftable members on a bale passing therebetween.

References Cited in the file of this patent

UNITED STATES PATENTS

| 1,992,716 | Paxton | Feb. 26, 1935 |
| 2,397,446 | Tansley | Mar. 26, 1946 |
| 2,551,464 | Raney | May 1, 1951 |
| 2,613,590 | Graybill | Oct. 14, 1952 |
| 2,724,324 | Clarke | Nov. 22, 1955 |

FOREIGN PATENTS

| 584,325 | Germany | Sept. 18, 1933 |